United States Patent
Leeser

(10) Patent No.: US 7,616,895 B2
(45) Date of Patent: Nov. 10, 2009

(54) SAFETY EDGE WITH STATUS AND FAILURE RECOGNITION

(75) Inventor: Achim Leeser, Cologne (DE)

(73) Assignee: Fraba NV, Heerlen (NL)

( * ) Notice: Subject to any disclaimer, the term of this patent is extended or adjusted under 35 U.S.C. 154(b) by 642 days.

(21) Appl. No.: 11/371,836

(22) Filed: Mar. 9, 2006

(65) Prior Publication Data

US 2006/0204206 A1    Sep. 14, 2006

(30) Foreign Application Priority Data

Mar. 9, 2005    (DE) .................. 10 2005 011 216

(51) Int. Cl.
    *H04B 10/00*    (2006.01)
(52) U.S. Cl. .................. 398/109; 398/106; 398/107; 398/108; 398/110; 398/118; 250/221; 250/227.14; 250/227.16; 250/222.1; 49/25; 49/26; 49/27; 340/545.1; 340/545.2; 340/555; 340/556; 340/545.3; 318/286; 318/280; 318/282; 318/466; 318/480
(58) Field of Classification Search .................. 398/106, 398/107, 108, 109, 110, 33, 25, 26, 27, 38, 398/10, 13, 118, 119, 122, 123, 135, 136, 398/137, 141; 250/221, 227.14, 227.16, 250/222.1; 49/26, 27, 25; 318/286, 280, 318/282, 466, 266, 480; 340/545.1, 545.2, 340/555, 556, 545.3

See application file for complete search history.

(56) References Cited

U.S. PATENT DOCUMENTS 7,157,689 B1 *   1/2007   Schmidt ............... 250/221
2005/0133699 A1 *   6/2005   Miremadi .............. 250/221

FOREIGN PATENT DOCUMENTS

EP          0 833 287         4/1998

* cited by examiner

*Primary Examiner*—Hanh Phan
(74) *Attorney, Agent, or Firm*—Porzio, Bromberg & Newman, P.C.

(57) ABSTRACT

A device and method for operating an optoelectronic safety sensitive edge (100) for the safeguarded motor-driven movement of a gate having a closing edge (141). The device has a deformable, hollow, elastic profile (110), a light transmitter device with a light transmitter (121a), and a transmitter control system (121b), by means of which at least one operating parameter of the light transmitter (121a) can be adjusted, a light receiver device (122) with a light receiver, the light transmitter device and the light receiver device (122) being coupled optically and electrically by the transfer of dynamic signals, an optical, dynamic coupling signal (K2, K2', K2") within the hollow profile (110); and an evaluating device (130) with means for detecting an electric, dynamic coupling signal (K2, K2', K2"), the evaluating device (130), generating a release signal in response to the detected, dynamic, electric coupling signal. The light transmitter device sends out a signal (K1", K2'''), in which information is coded, which is assigned to at least one operating parameter, such as an adjusting parameter of the light transmitter (121a).

20 Claims, 5 Drawing Sheets

SAFETY EDGE WITH STATUS AND FAILURE RECOGNITION

FIELD OF THE INVENTION

The invention relates to a safety sensitive edge with fault detection and status recognition, as well as to a corresponding method for operating such a device according to the introductory portion of claim 1.

BACKGROUND OF THE INVENTION

Such safety sensitive edges are used wherever moving edges represent a safety hazard for persons or objects. As a rule, this relates to the closing edge of, for example, a gate or a door. Moreover, these safety sensitive edges are also used in mechanical engineering and plant construction. They ensure that that, in accordance with the respective Standards, mechanically moved edges are stopped or reversed when they encounter an obstacle. Such a safety sensitive edge is described, for example, in the European patent EP 0 833 287 B1.

In the case of a generic, optoelectronic safety sensitive edge, a light-transmitter device and a light-receiver device are coupled optically as well as electrically with one another. They are thus components of a feedback loop, which has, as further components, has at least one electrical coupling lead and an optical coupling section. The electrical coupling lead for conducting the electrical signal is scanned by an evaluating device, which generates from the scanned signal a release signal, which can be used, for example, for controlling a driving mechanism. Conventional optoelectronic safety sensitive edges indicate over the release signal whether or not the gate can be moved further. In this respect, the state of the art cannot indicate whether this safety sensitive edge has responded because there is an object in the path of the gate or whether the electrical coupling signal, scanned by the evaluating device, indicates a fault, because a component of the coupling section, such as a light transmitter or light receiver, is defective or has failed.

SUMMARY OF THE INVENTION

It is an object of the invention to improve the functionality and operating reliability of conventional electronic safety sensitive edges.

Pursuant to the invention, this objective is accomplished in a surprisingly simple manner already by a method for operating an optoelectronic safety sensitive edge with the distinguishing features of claim 1 or an optoelectronic safety sensitive edge with the distinguishing features of claim 12.

In accordance with the inventive method for operating an optoelectronic safety sensitive edge for the safeguarded, motor-driven movement of a gate having a closing edge, light from a light-transmitting device is emitted dynamically and passed through a medium, such as air, to a light receiver device. In response to the light received, a dynamic, electrical coupling signal is generated, which is passed over an electric coupling lead back to the light-emitting device. The electric coupling signal is scanned and a release signal is generated in response to, that is, dependant on the electrical coupling signal detected. The inventive method is distinguished owing to the fact that bit-coded information concerning at least one operating parameter, such as the adjusting parameter of the light-transmitting device is passed over the electric coupling lead. It should be pointed out that the expression "dynamic light signal" or "dynamic electrical signal" indicates that the corresponding signal is time-dependent during the operation of the optoelectronic safety sensitive edge, but may be constant during particular operating states. The light-transmitting device is comprised of the light transmitter and the transmitter control system. To this extent, the given adjusting parameters may comprise adjustable operating parameters of the light transmitter and/or of the transmitter control system. It is self-evident that the transmitter control system need not necessarily be disposed at the same place as the light transmitter.

BRIEF DESCRIPTION OF THE DRAWINGS

In the following, the invention is explained by the description of several embodiments and further inventive distinguishing features with reference to the attached drawings, in which.

DETAILED DESCRIPTION OF VARIOUS ILLUSTRATIVE EMBODIMENTS

Figure 1:
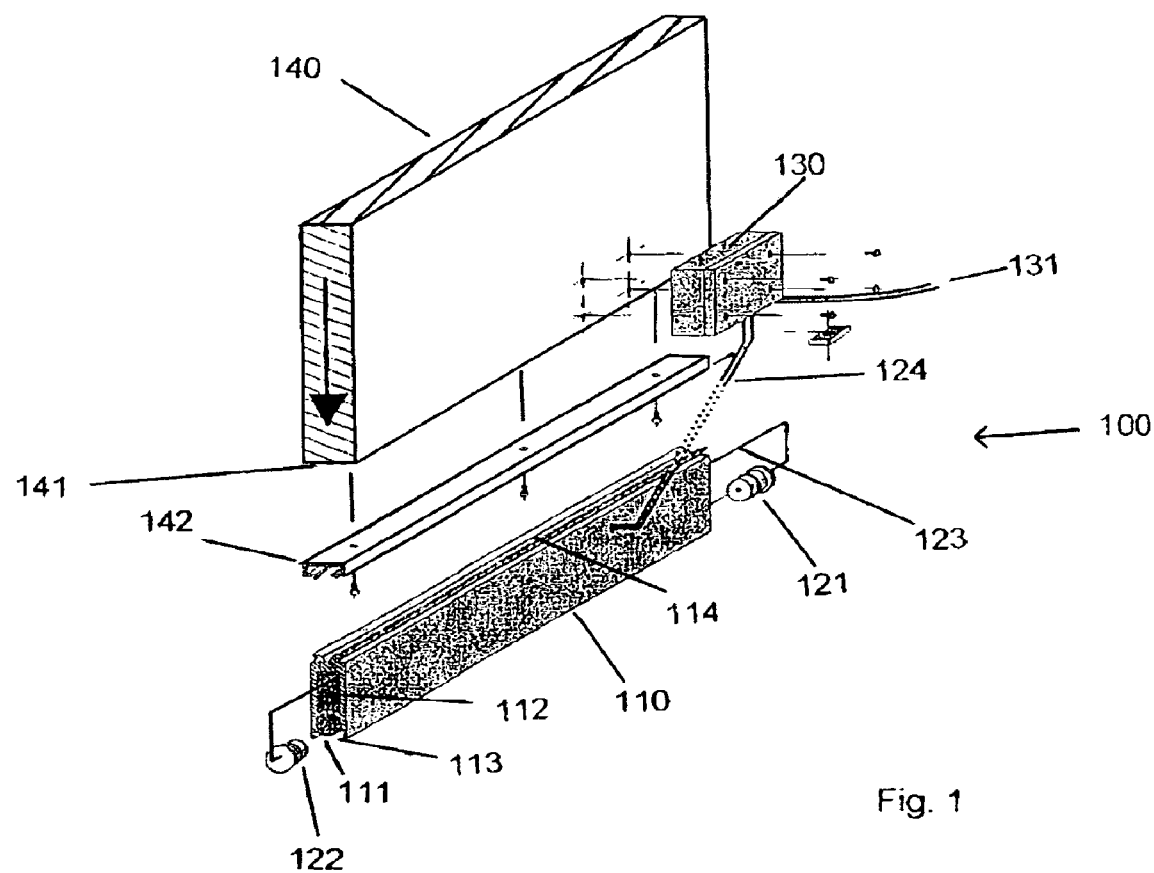
FIG. 1 shows an inventive safety sensitive edge with its essential components with reference to a safeguarding closing edge in an exploded representation.

A plurality of means, which emit light, such as an LED device, a laser device, etc., may be used as light transmitter. The light emitted need not necessarily be in the visible range.

Compared to conventional safety sensitive edges, the inventive method for operating an optoelectronic safety sensitive edge has the advantage that, in addition to the release signal, information concerning an operating state of the light-transmitting device, that is, at least one setting parameter from this device can also be detected and processed further. Since this additional information is passed bit-coded over the electric coupling lead, no expensive hardware modifications of conventional optoelectronic safety sensitive edges are necessary in order to obtain the advantages achievable with the invention. Under some circumstances, it is even possible to carry out the inventive method only by changing the way in which a conventional electronic safety sensitive edge is operated.

A further advantage of the inventive method and a further development of this method can also be seen therein that the possibility is created of detecting a pending failure of the light transmitter and, accordingly, of taking necessary measures before the failure, so that, in the final analysis, a functional incapacity of the inventive optoelectronic safety sensitive edge can be avoided. For example, if it is recognized that the set performance of the light transmitter is marginal (intensity level at the limit), this may mean that the light transmitter has been subjected to severe ageing changes and that too much extraneous light penetrates into the system, as a result of which the performance of the light transmitter was increased automatically, or also that the sensitivity of the receiver device is marginal because of ageing processes. As soon as this is detected by the system, necessary measures can be commenced in a timely manner in order to prevent total failure of the system. A fault or a shortly pending fault of the safety sensitive edge can thus be recognized. Moreover, the possibility may exist advantageously of making operating parameters of the safety sensitive edge available over an appropriate interface.

The invention is based on the idea of using the electric coupling lead of a conventional optoelectronic safety sensitive edge not only for conducting an electrical feedback signal, which can be detected, for evaluation purposes for generating a release signal, but also for conducting bit-coded information concerning at least one operating parameter of the elements, incorporated in the feedback section, especially a setting parameter of the light transmitter, and/or the transmitter control system. This bit-coded information can also be read by the electrical coupling lead.

Advantageous embodiments of the invention are given in the dependent claims.

Pursuant to the invention, the bit-coded information of at least one operating parameter can be supplied to the light transmitter on the electric coupling lead in various ways, depending on the embodiment. In particular, it may be appropriate if the light transmitter is triggered for putting out a light signal comprising bit-coded information concerning at least one setting parameter of the light transmitter, the light signal being transferred to and received by the light receiver device. Advisably, the information, coded in the light signal, is processed in the light receiver device and, as coded information, is converted into an electrical signal, which is fed back into the light transmitter device, that is, placed onto the electric coupling lead between the light receiver device and the light transmitting device. In this way, it is achieved that the information, which can be read concerning at least one operating parameter of a component, especially of the light transmitter, is carried on the electric coupling lead.

In order to make the information concerning adjustable operating parameters of the light receiver device available so that it can be processed further or passed on, provisions may be made so that the light receiver device is triggered for the output of an electric coupling signal comprising coded information concerning at least one setting parameter of the light-receiving device. In a particularly advantageous embodiment, provisions may also be made so that information concerning its own setting parameters, as well as information concerning operating parameters of the light transmitting device, which is transferred over optical paths to the light receiver device is placed as a signal on the electric coupling lead.

In particular embodiments, it may also be appropriate, if the light-transmitting device puts out a signal, which comprises electrical, bit-coded information concerning at least one adjustable operating parameter of the light transmitter and is placed directly onto the electric coupling lead. With that, the need for converting this information in the light receiver device is avoided.

Advisably, the electric coupling signal is decoded for acquiring information relating to at least one adjustable operating parameter of the light transmitter and/or of the light receiver. In this respect, information is acquired, which subsequently is available for further processing or for output.

This information, now available within the inventive safety sensitive edge, can be processed in various ways for raising the functionality of the safety sensitive edge. For example, it may be appropriate, if at least one limiting value of an adjustable operating parameter of the light transmitter and/or of the light receiver is stored and the overshooting of at least one of these limiting values is indicated either optically by means of a display or also over an analog or digital output. Accordingly, it is possible to draw attention to a pending failure with the inventive safety sensitive edge, so that appropriate measures can be taken, such as the exchange of the part in question.

It may be appropriate, if such an adjustable operating parameter of the light transmitter and/or of the light receiver can be put out by an appropriate outlet of an evaluating device.

It is particularly advantageous, if the variation of at least one adjustable operating parameter of the light transmitter and/or of the light receiver is determined as a function of time, so that it is possible to differentiate, between an operating parameter, which reaches a limiting value gradually and one, which reaches it suddenly. In the first case, this indicates an ageing process and, in the second case, sudden damage to the system, such as damage to the deformable hollow profile, in which, as a rule, the optical coupling signal runs between the light-transmitting device and the light-receiving device in the case of an inventive optoelectronic safety sensitive edge. It is especially the recognition of such sudden changes in adjustable operating parameters of the inventive safety sensitive edge, which enables appropriate measures to be initiated before limiting values of the adjustable operating parameters are reached.

Such adjustable operating parameters relate essentially to the light transmitter device and the light receiver device. In the case of the usual operation, for which the optical coupling signal is transmitted from the light transmitter device to the light receiver device, detected by the latter, converted into a corresponding electrical signal and then once again returned over the electric coupling lead to the light-transmitting device, certain operating parameters can be adjusted automatically during the operation. For example, the light transmitter device can increase the performance of the light transmitter until a response of the light receiver device is received on the electrical coupling lead. Depending on the embodiment, this process can be repeated frequently during the operation in order to ensure that the sensor system for detecting an object is set up within the traverse path. It is now possible to detect in the inventive optoelectronic safety sensitive edge, how the adjustable operating parameters of the component change and thus to gain information concerning the operational capability of the safety sensitive edge.

The bit-coded information concerning at least one adjustable operating parameter of the light transmitter and/or of the light receiver can be applied on the electric coupling lead within a usual operating phase of the safety sensitive edge as well as outside of such an operating phase. In this connection, the concept of "operating phase" refers to a time interval, within which the inventive optoelectronic safety sensitive edge is operated for generating the release signal, that is, a phase, during which it is determined whether an object is within the traverse path of the gate. However, it is particularly advantageous if the information concerning at least one adjustable operating parameter of the light transmitter and/or of the light receiver is collected and processed outside of such an operating phase. For example, provisions can be made so that, within an initialization phase, information concerning one such adjustable operating parameter of one of the types described above, is placed on the electric coupling lead, and this information is tapped and processed further or put out. The temporal separation of the operating phase of the inventive optoelectronic safety sensitive edge from such an initialization phase has the advantage that, before the inventive safety sensitive edge is started up, its status can be determined and, if boundary conditions exist, specified measures can be initiated. In this connection, it may be advantageous, if the initialization phase described is carried out in response to an externally prepared control signal. For example, the initialization phase can be started, owing to the fact that the electric supply is separated from the transmitter device and/or the receiver device or also from the whole of the safety sensitive edge. The starting of the initialization phase in response to an external control signal is advantageous particularly in cases, in which the inventive optoelectronic safety sensitive edge is installed in doors of vehicles such as rail vehicles. It is advisable to carry out the initialization phase described at times, when the vehicle is moving, that is, when the doors are closed.

With regard to the equipment, the above-described objective, on which the invention is based, is accomplished by an optoelectronic safety sensitive edge for the safeguarded, motor-driven movement of a gate having a closing edge, which has a deformable, especially an elastic hollow profile, a light transmitter device with a light transmitter and a transmitter control system, over which at least one operating parameter of the light transmitter is adjustable, as well as a light receiver device with a light receiver, the light transmitter device and the light receiver device being coupled optically and electrically by the transfer of dynamic signals and an optical dynamic coupling signal passing at least sectionally within the hollow profile. Moreover, the equipment comprises an evaluating device with means for detecting an electric, dynamic coupling signal, the evaluating device generating a release signal in response to the dynamic electric coupling signal detected. The inventive, optoelectronic safety, sensitive edge is distinguished owing to the fact that the light-transmitting device sends out a signal, in which the information, which is assigned to at least one adjustable operating parameter of the light transmitter, is coded, For carrying out the inventive method described above, it may be appropriate, if the receiver device has means for detecting the information in the optical coupling signal concerning at least one adjustable operating parameter and for coding this information in the electrical coupling signal. Moreover, it may be appropriate, if the light transmitter device has an output device connected with the electric coupling lead for putting out an electric signal on the electrical coupling lead, which, with coded information, comprises at least one adjustable operating parameter of the light transmitter. Correspondingly, it is appropriate if the evaluating device has decoding means for decoding this information in the electric dynamic signal. In order to provide information other than the release signal to the outside, provisions may be made so that the evaluating device comprises a digital and/or an analog output device. For the external control of the inventive, optoelectronic safety sensitive edge, provisions can also be made so that the latter has a digital and/or analog input device.

The essential components of an inventive safety sensitive edge for the safeguarded, motor-driven movement of a gate having a closing edge, are shown in FIG. 1. The example given shows the safety sensitive edge 100, which is to be fastened to a roller shutter, of which a shutter segment 140 is shown. The sensitive edge 100 comprises, as essential components, an optical transmitter device 121 and an optical receiver device 122, which are coupled over an electric coupling lead 123 and the light path between the transmitter device and the receiver device, so that a feed-back loop is created. In a manner not shown, a lead 124 connects the electrical coupling lead 123 with an evaluating device 130. In the example shown, the safety sensitive edge 100 detects the deformation of a hollow rubber profile 110, which is constructed rectangularly and has a so-called switch chamber 111 as well as a tracking chamber 112, both of which extend at a distance from one another along a hollow profile. In the embodiment shown, the switching chamber 111 is constructed in the shape of a hollow cylinder, the optical transmitter device 121 being introduced at a first end and the assigned optical receiver device at the other end of the profile.

The periphery of the transmitter device as well as that of the receiver device is fitted to the periphery of the switching chamber, so that these can simply be inserted. The transmitter device 121 comprises a light transmitter 121a in the form of an LED and an assigned transmitter control 121b, which triggers the light transmitter to emit light. In an appropriate manner, the receiver device 122 comprises an optical receiver 122a in the form of a photodiode, which is matched to the light emitted by the light transmitter 121a. Accordingly, the components given form an optoelectronic sensitive edge, at which the light, emitted by the light transmitter 121a, is taken up by the receiver 122a, converted into electrical pulses assigned to the optical pulses and transmitted over the electric coupling lead 123 back to the light transmitter. The components named accordingly form a feedback system.

On the longitudinal side, which faces the closing edge 141 of the gate, the hollow rubber profile 110 has two link plates 114, which enable lateral insertion in a C profile 142. The C profile 142 itself is fastened to the closing edge 141 of the gate by means of screws.

As already stated, the dynamic electric coupling signal from the electric coupling lead 123 is tapped by the lead 124 and taken to the evaluating device 130, which works as a central control device. The electric coupling signal is evaluated there and, in response thereto, that is, depending on the coupling signal detected, an output signal S1 of the optoelectronic safety sensitive edge 100, which is put out over the output signal lead 131 and is referred to as the release signal, is generated. This output signal of the sensitive edge is taken in a manner not shown to a control system for the gate driving mechanism, which evaluates the signal, for example, in order to move the gate further in the closing direction as requested by the release signal, or to stop or reverse the gate, when the actuation of the safety sensitive edge is detected. This operating state occurs, if, during the movement of the closing edge 141, the latter is moved against an obstacle, as a result of which, to begin with, the hollow profile 110 comes up against the obstacle and is deformed.

Figure 2:
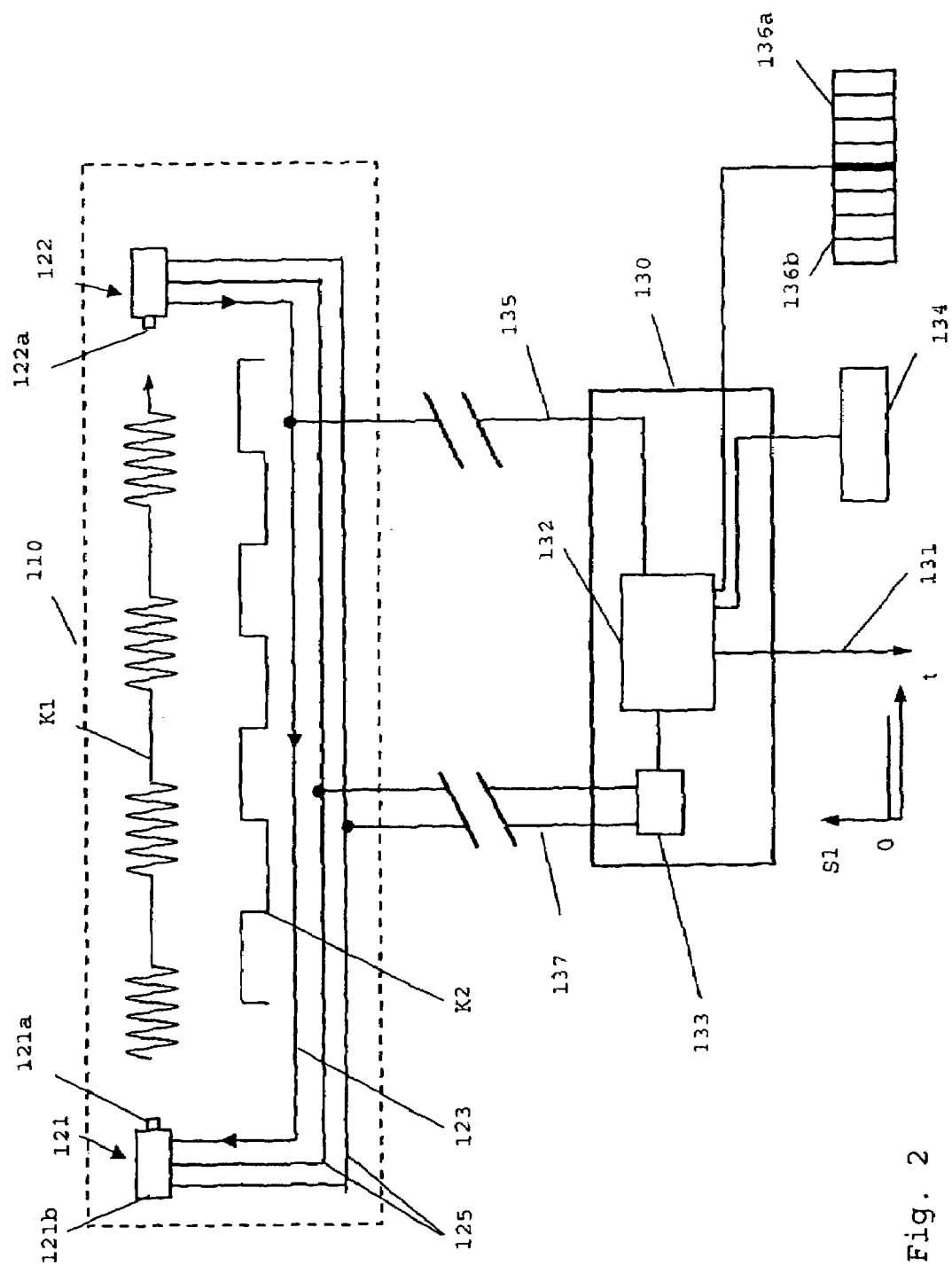
FIG. 2 shows a diagrammatic sketch of an inventive safety sensitive edge in a first operating state.

Reference is made to FIG. 2, which represents a diagrammatic sketch of the sensitive edge, for describing the mode of functioning of the inventive safety sensitive edge. The safety sensitive edge comprises the sensor system, consisting of the hollow profile 110 and the coupled transmitter and receiver devices 121, 122. The evaluating device 130 is connected with the sensor system over the electrical tapping lead 135, which is connected to the electrical coupling lead 123. For supplying the sensor system with energy, the evaluating device 130 has a controllable voltage source 133, with which the transmitter device 121 and the receiver device 122 are connected over the supply leads 137. In this respect, the lead connection 124 in FIG. 1 of the summary corresponds to the tapping lead, 135, and the supply leads 137, shown in FIG. 2.

Corresponding to the explanations in connection with FIG. 1, the optical transmitter 121a emits dynamic light pulses, which are shown as an optical coupling signal K1. These light pulses are detected by the receiver device 122 and converted in a predetermined manner into an electrical coupling signal K2, which is fed back over the electric lead 123 to the transmitter device 121. Information as to whether the light, emitted by the transmitter device 121, has arrived at the receiver device 122, is supplied over this feedback to the optical transmitter device 121. The electrical coupling signal, detected by means of the tapping lead 135, is supplied to a processor 132 in the evaluating device 130, which represents the intelligence of the evaluating device. The processor has an A/D converter, which is not shown in the Figure, in order to convert the electrical coupling signal detected, so that the information can subsequently be processed digitally.

The electrical coupling signal K2 is processed in the processor in order to determine whether or not the safety sensitive edge is actuated, that is, whether the light path between the transmitter 121a and the receiver 122a is or is not obstructed. Depending on the result of the data processing, the evaluating device 130 emits a corresponding release signal S1, the variation of which over time is shown to the left of the signal lead, over the signal lead 131. In the operating situation shown in FIG. 2, the light pulses are received by the receiver device 122 and converted into electrical pulses, which are placed on the electrical coupling lead 123. These electrical signals, arriving at the transmitter device, are then used, in turn, for controlling the output of corresponding optical light pulses, which are detected by the receiver device 122 and processed further, as described, etc. If no obstacle is detected, the signal S1 indicates that the driving mechanism can be actuated further.

In order to achieve at least batchwise a certain adaptation of the safety sensitive edge to changed operating conditions, as caused by surrounding light or ageing phenomena of the participating components, provisions are made so that the power, with which the light transmitter 121a sends out light pulses, is adjusted automatically. This is accomplished in that the transmitter 121a sequentially emits light pulses with different intensities, and the light intensity, which is required so that the receiver 122a still recognizes these light pulses, is determined in this way. Such an automatic adaptation of the system to the circumstances is very advantageous. However, for conventional safety sensitive edges, information concerning how individual operating parameters of the system must be adjusted so that the operation can be maintained, is not available in the evaluating device.

Furthermore, as also shown in FIG. 2, a display 134, controlled by the processor 132, as well as a digital input/output device 136a as well as an analog input/output device 136b, which will be dealt with in greater detail below, are included.

Figure 3:
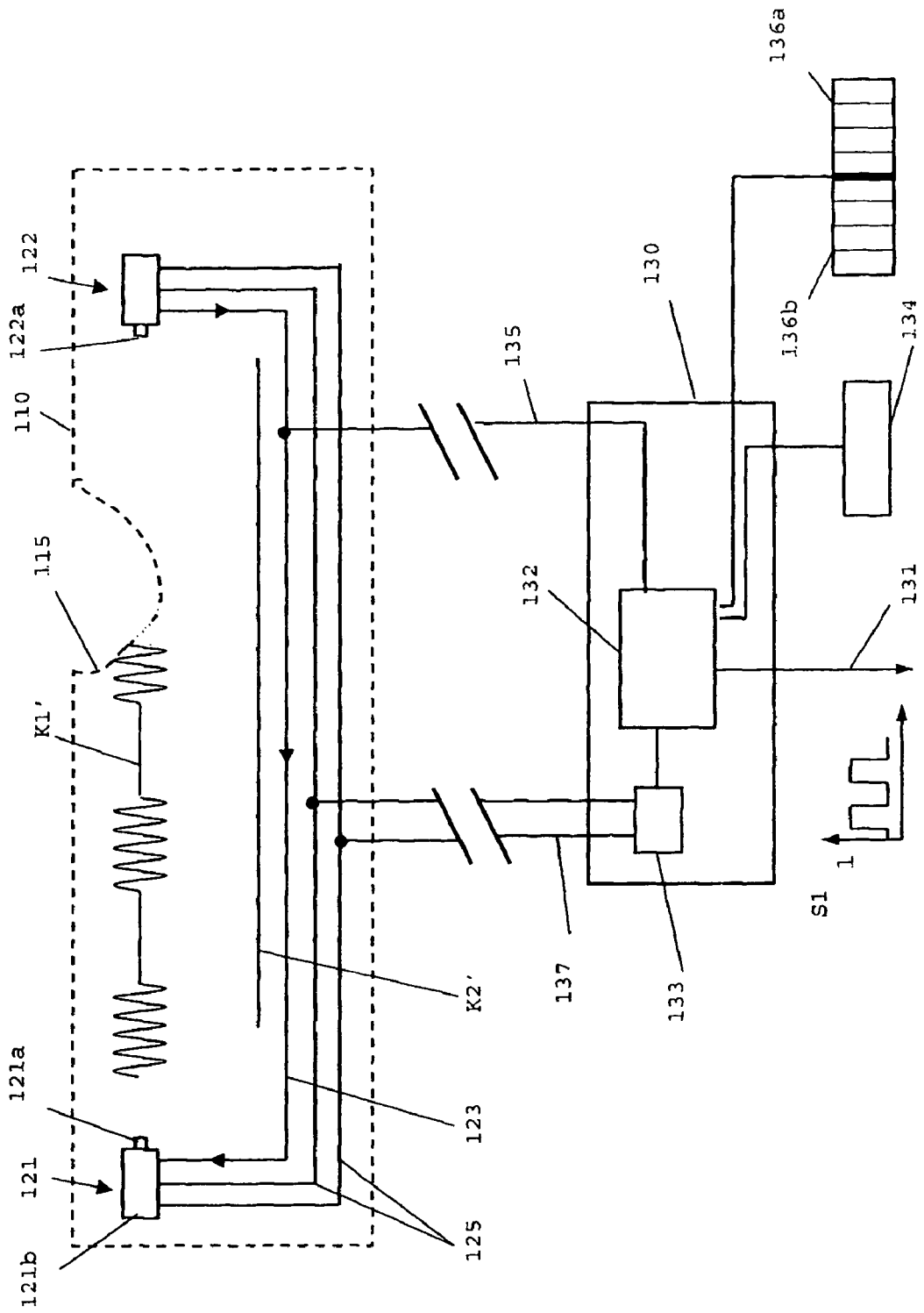
FIG. 3 shows the inventive safety sensitive edge of FIG. 2 in a second operating state.

FIG. 3 shows another operating situation, which is different from that of FIG. 2. The optical path between the transmitter device 121 and the receiver device 122 is interrupted by an elastic deformation 115 of the closing profile 110 caused by an obstacle, which is not shown, so that the receiver 122a transmits an appropriate electrical coupling signal K2 to the transmitter 121 over the electrical coupling, lead 123. A comparison of the signal K2' with the operating situation in FIG. 2 shows that the electrical coupling signals K2 and K2' are different. This is also detected over the tapping lead 135 by the processor 132, which subsequently, in response to the electrical coupling signal detected, puts out an assigned release signal S1 to the output signal lead 131. This signal S1 differs from the output signal of the situation shown in FIG. 2 and causes the driving mechanism, which is not shown, to be stopped or reversed.

Figure 4:
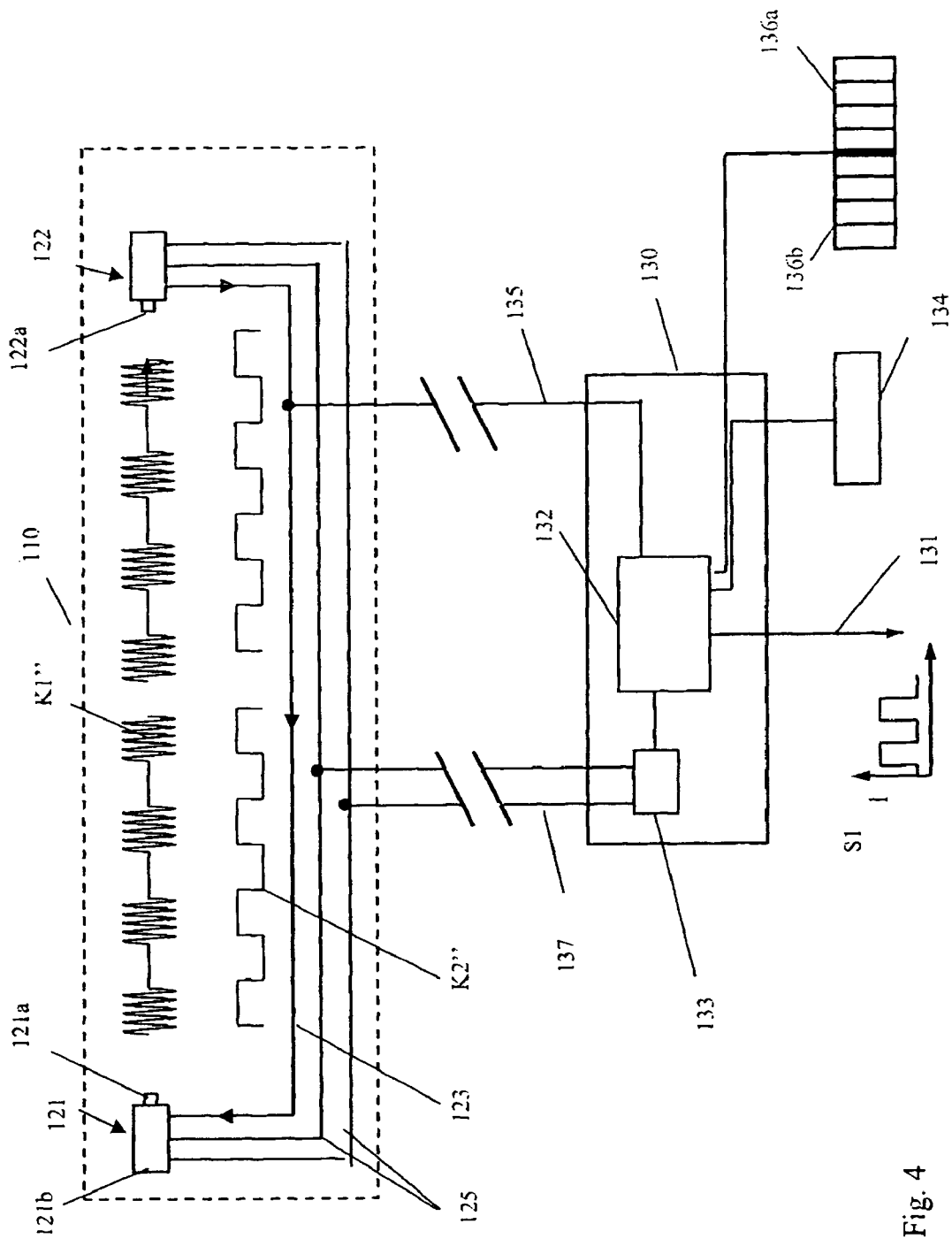
FIG. 4 shows the safety sensitive edge of FIGS. 2 and 3 in an initialization phase; and, FIG. 5 shows a diagrammatic sketch of a further inventive safety sensitive edge in an initialization phase.

FIG. 4 shows a further operating situation of an inventive safety sensitive edge with an essential difference from conventional optoelectronic safety sensitive edges. The sensitive edge is in an initialization phase, for which the optical transmitter device 121 sends out an optical coupling signal K1", which is detected by the receiver device 122 and processed. The optical signal K1" comprises bit-coded information concerning the set performance of the light transmitter 121a. This optical signal K1" is processed in the receiver device 122 in exactly the same manner as the optical signal K1 shown in FIG. 2. In the end, the optical signal K1" is converted into an assigned electrical signal K2", which is placed by the receiver device 122 onto the electrical coupling lead 123. The information concerning the set performance of the light transmitter 121a, coded in the optical signal K1", accordingly is also coded in the electrical coupling signal K2", which can now be detected and processed over the tapping lead 135 by the processor 132 in the evaluating device 130. In principle, any adjustable operating parameter of the transmitter device can be transmitted in the way described, that is, from the transmitter as well as from the transmitter control system to the evaluating device 130, without requiring additional leads or special hardware modifications to conventional safety sensitive edges. The operating parameters of the transmitting device detected may then be processed further in the evaluating device.

In an embodiment not shown, provisions may also be made so that the receiver device 122 itself places, information concerning an adjustable operating parameter assigned to it on the electrical coupling lead 123. This information is then detected, as described, over the tapping lead 135 by the processor 132.

The electrical signal is digitized in the processor 132, and the coded information concerning one or more operating parameters of the transmitter device and/or the receiver device is decoded. In the example, shown in FIG. 2, a display 34 as well as a digital input/output device 136a and an analog input/output device 136b are connected to the evaluating device 130. The initialization phase, shown in FIG. 4, is started over one of the digital inputs of the input/output device 136a. After the start signal is detected by the processor unit 132, the latter controls the voltage source 133 for switching off and subsequently for switching on, which produces a reset of the transmitter device and of the receiver device. The above-described initialization phase, for which at least an operating parameter, coded in an electrical signal, is placed on the electrical coupling lead 123, is always started after such a reset. The operating parameter or parameters determined are then displayed at the device 134 and provided as an analog value by way of the output device 136b. As shown in FIG. 4, the release signal 131 at the time of the initialization phase corresponds to a signal of the operating situation shown in FIG. 3. Accordingly, it is achieved that the driving mechanism is blocked during the initialization phase.

In a particular embodiment of the invention, several operating parameters of the transmitter device and/or the receiver device are transferred sequentially to the evaluating device 130. The performance or current uptake of the transmitter, certain control parameters of the transmitter control system, the current uptake of the receiver device, etc. are examples of such operating parameters. If required, all operating parameters detected by the devices 136a/136b can be put out and processed further.

After the expiration of the initialization phase, the inventive safety sensitive edge automatically changes over into the usual operation, for which a coupling signal within the coupling section 40 proceeds to detect the situation, for which the optical light path is interrupted, that is, for which an object is in the traverse of the gate.

Figure 5:
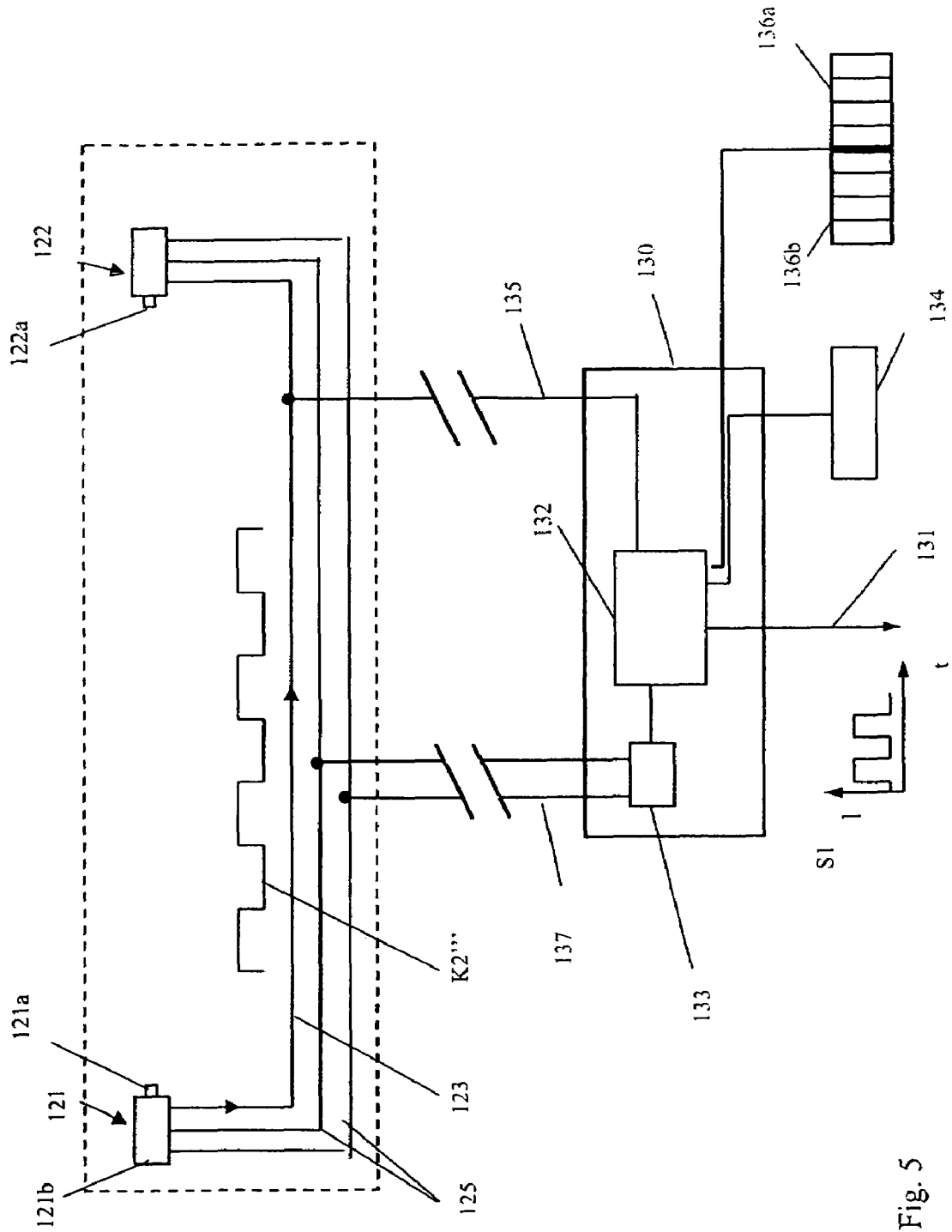

FIG. 5 shows a further embodiment of an inventive safety sensitive edge, which differs from the safety sensitive edge shown in FIG. 4 owing to the fact that an operating parameter, assigned to the optical transmitter device, is not realized by means of the coding of corresponding information by the optical transmitter device in the light signals emitted. Instead, the transmitter device places this information in coded form directly on the electrical coupling lead 123. For this purpose, the light transmitter device has an appropriate output device, with which the electrical signal is switched onto the electrical coupling lead. This information can be detected and decoded by the evaluating device 130 as described in relation to FIG. 4. For this embodiment, as is known to those of ordinary skill in the art, the signal, loaded with an operating parameter, cannot run in the feedback loop, as can a conventional coupling signal, since the transmitter is not controlled here for sending out corresponding light pulses.

Accordingly, by processing the operating parameters detected, it is possible to recognize in a timely manner, whether a component is working at the limit or is about to fail. Faults, which are about to take place, are detected in this manner. The corresponding information is indicated at the display 134 or put out over analog or digital outputs 136a, 136b.

Furthermore, the processor 132 has a storage device, in which detected operating parameters are filed. For example, one or more values of an operating parameter are stored in each initialization phase. In this way, it is possible to detect a change in an operating parameter as a function of time over a longer period of time and, accordingly, to recognize in timely fashion when failure of this component is threatening.

LIST OF REFERENCE SYMBOLS 100 safety sensitive edge
110 hollow profile
111 switch chamber
112 tracking chamber
113 light lip
114 link plate
115 deformation
121 optical sensor device
121a light transmitter
121b transmitter control system
122 receiver device
122a optical receiver
123 electric coupling lead
124 lead connection
125 supply lead
130 evaluating device
131 output signal lead
132 processor
133 voltage source
134 display
135 tapping lead
136a digital input/output device
136b analog input/output device
137 bolted supply lead
140 gate segment
141 closing edge
142 C profile
K1, K1,
K1" optical coupling signal
K2, K2',
K2", K2'" electrical coupling signal
S1 output signal

I claim:

1. A method for operating an optoelectronic safety sensitive edge for the safeguarded motor-driven movement of a gate having a closing edge comprising the following steps:
    emitting light dynamically from a light transmitter device having a light transmitter and a transmitter control system;
    guiding the emitted light to a light receiver device;
    generating an electrical coupling signal in response to the light received;
    passing the electrical coupling signal back over an electrical coupling lead to the light transmitter device scanning the electrical coupling signal and,
    generating a release signal in response to the electrical coupling signal;
    wherein bit-coded information concerning an adjusting parameter of the light transmitter device is passed over the electrical coupling lead to the light transmitter device and/or light receiving device for controlling the light transmitter and/or light receiver device.

2. The method as recited in claim 1 wherein the light transmitter is controlled for the output of a light signal comprising the bit-coded information concerning at least one adjusting parameter of the light transmitter, the light signal being transferred to and received by the light receiver device.

3. The method as recited in claim 1 characterized in that, in response to the receiving of the light signal by the light receiver device, which comprises bit-coded information concerning at least one adjusting parameter of the light transmitter, an electric signal is generated, which is fed back into the light transmitter device and contains the bit-coded information.

4. The method as recited in claim 1 characterized in that the light receiver device is controlled for the output of an electrical coupling signal, comprising coded information concerning at least one adjusting parameter of the light receiver device.

5. The method as recited in claim 1 characterized in that an electrical signal is put out, which contains electrical, bit-coded information concerning at least one adjusting parameter of the light transmitter and is placed on the electrical coupling lead.

6. The method as recited in claim 1 characterized in that the electrical coupling signal is decoded for detecting information relating to the at least one adjusting parameter of the light transmitter and/or of the light receiver.

7. The method as recited in claim 1 characterized in that the exceeding of a specified limiting value of an adjusting parameter of the light transmitter and/or of the light receiver is indicated over at least one digital output.

8. The method as recited in claim 1 characterized in that at least one adjusting parameter of the light transmitter and/or of the light receiver is put out by an evaluating device.

9. The method as recited in claim 1 characterized in that the variation of at least one adjusting parameter of the light transmitter and/or of the light receiver device as a function of time is determined and stored.

10. The method as recited in claim 1 characterized in that the light transmitter is controlled in the initialization phase for the output of the light signal, comprising the bit-coded information concerning at least one adjusting parameter of the light transmitter, and subsequently the safety sensitive edge is operated for generating the release signal.

11. The method as recited in claim 10 characterized in that the initialization phase is carried out in response to an externally prepared control signal the light transmitter device and/or the light receiver device being separated from the electrical power supply for starting the initialization phase.

12. An optoelectronic safety sensitive edge for the safeguarded motor-driven movement of a gate having a closing edge comprising:
    a deformable, hollow, elastic profile;
    a light transmitter device with a light transmitter, and a transmitter control system, by means of which at least one operating parameter of the light transmitter can be adjusted;

a light receiver device with a light receiver, the light transmitter device and the light receiver device being coupled optically and electrically by the transfer of dynamic signals;

an optical, dynamic coupling signal within the hollow profile; and, an evaluating device with means for detecting an electric, dynamic coupling signal, the evaluating device, generating a release signal in response to the detected, dynamic, electric coupling signal;

wherein the light transmitter device sends out a signal, in which information bit-coded, which is assigned to an adjusting parameter of the light transmitter.

13. The optoelectronic safety sensitive edge for the safeguarded motor-driven movement of a gate having a closing edge as recited in claim 12 wherein the signal comprising the bit-coded information concerning at least one adjusting parameter of the light transmitter is sent out by the light transmitter as an optical signal and the receiver device has means for detecting the information in the optical coupling signal and for coding this information in the electric coupling signal.

14. The optoelectronic safety sensitive edge for the safeguarded motor-driven movement of a gate having a closing edge as recited in claim 12 wherein the light transmitter device has an output device, which is connected with the electric coupling lead, for the output of an electric signal comprising the bit-coded information concerning at least one adjusting parameter of the light transmitter.

15. The optoelectronic safety sensitive edge for the safeguarded motor-driven movement of a gate having a closing edge as recited in claim 12 wherein the evaluating device has decoding means for decoding information in the electric dynamic signal, which is assigned to at least one adjusting parameter of the light transmitter and/or of the light receiver.

16. The optoelectronic safety sensitive edge for the safeguarded motor-driven movement of a gate having a closing edge as recited in claim 12 wherein the evaluating device has an digital input/output device, at which the exceeding of a specified limiting value of an adjusting parameter of the light transmitter and/or of the light receiver can be indicated.

17. The optoelectronic safety sensitive edge for the safeguarded motor-driven movement of a gate having a closing edge as recited in claim 12 wherein the evaluating device has an output device, at which at least one adjusting parameter of the light transmitter and/or of the receiving device can be put out.

18. The optoelectronic safety sensitive edge for the safeguarded motor-driven movement of a gate having a closing edge as recited in claim 12 wherein digital inputs and outputs, it being possible to put out the release signal over a first output and a fault signal over a second output, as well as to detect a signal, co-determining the nature of the operation of the terminal strip, at an input.

19. The optoelectronic safes sensitive edge for the safeguarded motor-driven movement of a gate having a closing edge as recited in claim 12 wherein a fault source can be indicated at least at one output.

20. The optoelectronic safety sensitive edge for the safeguarded motor-driven movement of a gate having a closing edge as recited in claim 12 wherein an output device of the receiver device, which is connected with the electrical coupling lead and which puts out bit-coded information concerning at least one electrical signal comprising an adjusting parameter of the light receiver device.

* * * * *